United States Patent [19]

Skaletz

[11] Patent Number: 4,952,313
[45] Date of Patent: Aug. 28, 1990

[54] APPARATUS FOR CARRYING OUT MEMBRANE SEPARATION PROCESSES

[75] Inventor: Detlef Skaletz, Mainz-Bretzenheim, Fed. Rep. of Germany

[73] Assignee: Hoechst Aktiengesellschaft, Frankfurt am Main, Fed. Rep. of Germany

[21] Appl. No.: 425,008

[22] Filed: Oct. 20, 1989

[30] Foreign Application Priority Data

Oct. 25, 1988 [DE] Fed. Rep. of Germany ....... 3836308

[51] Int. Cl.⁵ ............................................ B01D 63/10
[52] U.S. Cl. ........................... 210/321.76; 210/321.85
[58] Field of Search ........... 270/321.6, 321.72, 321.74, 270/321.83, 321.85, 321.76, 195.2, 257.2, 493.4, 497.1

[56] References Cited

U.S. PATENT DOCUMENTS

| | | | |
|---|---|---|---|
| 3,966,616 | 6/1976 | Bray | 210/433 M |
| 4,019,988 | 4/1977 | Ziegler | 210/494 R |
| 4,059,530 | 11/1977 | Luppi | 210/321 B |
| 4,235,723 | 11/1980 | Bartlett | 210/321 R |
| 4,475,973 | 10/1984 | Tanaka | 156/184 |
| 4,769,140 | 9/1988 | van Dijk et al. | 210/321.75 |

FOREIGN PATENT DOCUMENTS

0253945 1/1988 European Pat. Off. .

*Primary Examiner*—Frank Sever
*Attorney, Agent, or Firm*—Foley & Lardner, Schwartz, Jeffery, Schwaab, Mack, Blumenthal & Evans

[57] ABSTRACT

An apparatus for carrying out membrane separation processes is described. It comprises a housing, at least one spirally wound-up membrane pocket arranged within the housing and containing at least one drainage layer and semipermeable membranes applied to both sides thereof, a spacer between the individual wound plies of the membrane pocket, a centrally arranged collection line, a first end-face opening as an inlet for the material to be separated, a second end-face opening as an outlet for the concentrate and a discharge line for the permeate which has passed into the collection line. The permeate passage from the membrane pocket into the collection line is kept sealed from the space filled with the material to be separated by means of spring-elastic elements, and the semipermeable membranes are mutually joined by energy-bonded seams in the membrane pocket regions adjacent to the side edges. According to the invention no adhesive is required for the apparatus.

10 Claims, 3 Drawing Sheets

APPARATUS FOR CARRYING OUT MEMBRANE SEPARATION PROCESSES

BACKGROUND OF THE INVENTION

The invention relates to an apparatus for carrying out membrane separation processes, comprising a housing, at least one spirally wound-up membrane pocket arranged within the housing and containing at least one drainage layer and semipermeable membranes applied to both sides thereof, a spacer between the individual wound plies of the membrane pocket, a centrally arranged collection line, a first end-face opening as an inlet for the material to be separated, a second end-face opening as an outlet for the concentrate and a discharge line for the permeate which has passed into the collection line.

Such types of apparatus, which are in general called membrane modules, are known in the literature and are described in the most diverse embodiments for various applications (see, for example Ullmann, Enzyklope/ der technischen Chemie, [Encyclopedia of Industrial Chemistry], 4th edition, volume 2, page 188). In the case of the spirally wound-up membrane elements, however, there are known problems, in particular with respect to the sealing of the membrane elements in the side regions or in the region of the inlet to the collection line (Ullmann).

DE-A-3,033,800 describes that, for solving these sealing problems, the membranes forming the wound membrane element should be mutually joined by adhesives in the regions adjacent to the side edge. However, the use of adhesive, when carrying out membrane separation processes, sometimes leads to far-reaching problems, in particular in operation or in cleaning of the membrane elements at higher temperatures and/or with organic solvents. There are problems also in types of apparatus where economical utilization of the total membrane surface is important and when carrying out separation processes in connection with foodstuffs or luxury foods intended for consumption.

SUMMARY OF THE INVENTION

It is therefore an object of the present invention to provide an improved membrane separation apparatus in which undesired contamination of the highly pure permeate with material that is to be separated is effectively prevented.

It is a further object of the invention to provide a membrane separation apparatus in which contamination is prevented even if the separation process is to be carried out at elevated temperatures, in particular from about 45 to 100° C., or in the presence of organic solvents.

A further object of the invention resides in the provision of a membrane separation apparatus which also permits cleaning operations at high temperatures (above 100° C.) and/or with the aid of organic solvents.

Still another object of the invention is to provide a membrane separation apparatus in which essentially all of the membrane area is available for the permeation process and is utilized.

It is a further object of the invention to provide an apparatus that is also suitable for separation processes in connection with materials that are subject to strict purity requirements such as, for example, foodstuffs.

In accomplishing the foregoing objects, there has been provided according to the present invention an apparatus for carrying out a membrane separation process, which comprises: (a) a centrally arranged collection line having at least one aperture therein; (b) at least one spirally wound-up membrane pocket arranged around the collection line, the membrane pocket containing at least one drainage layer and semipermeable membranes applied to both sides thereof, wherein the semipermeable membranes are mutually joined by energy-bonded (welded) seams at their edges to form the pocket; (c) a spacer between individual windings of the membrane pocket, defining a space for receiving material to be separated; (d) means defining a permeate passage from the drainage layer through the aperture into the collection line; and (e) means for spring-elastically sealing the permeate passage from the space for receiving the material to be separated.

Further objects, features and advantages of the invention will become apparent from the detailed description of preferred embodiments that follows, when considered together with the attached figures of drawing.

DETAILED DESCRIPTION OF THE PREFERRED EMBODIMENTS

In the apparatus according to the invention, the permeate passage from the membrane pocket into the collection line is kept sealed, by means of string-elastic elements, from the space filled with the material to be separated, and the semipermeable membranes are mutually joined by energy-bond seams in the membrane pocket regions near to the side edge.

In operation, a material which is to be separated (separation material), for example, a solution, brackish water or a gas mixture, is introduced through the inlet into the housing of the apparatus according to the invention. In the housing, the material to be separated immediately comes into contact with the spirally wound-up membrane pockets, separated from one another by spacers, and flows parallel to the collection line along the membrane pockets in the direction of the end-face outlet, where it leaves the housing again. During the flow process, a part of the material to be separated, the permeate, diffuses through the semipermeable membranes into the interior of the membrane pockets, where the drainage layer is located. Suitable drainage layers are any types of fluid-permeable sheet-like structures, such as sponge bodies, woven fabrics, nonwovens, fiber braidings and the like, which essentially must have the property of exerting as little resistance as possible to a medium flowing through them. The permeate then flows in the interior of the membrane pockets, following the spiral windings, towards the collection line arranged in the center of the winding and enters the collection line through holes made in the wall thereof. The membranes envelop the drainage layer on all sides, in order to form the membrane pockets. Since the membranes are mutually joined, according to the invention, by tight seams at the edges and since the passage of the permeate from the membrane pockets into the collection line is sealed by spring-elastic elements, no adhesive is required for the apparatus according to the invention.

Between the windings of the individual membrane pockets, spacers are arranged which can be composed of the same or a similar material as that of the drainage layer in the interior of the membrane pockets.

The choice of the semipermeable membrane depends on the type of separation process. In principle, all commercially available symmetrical, asymmetrical and/or integral-asymmetrical (thin film composite) membranes of plastics such as, for example, membranes of various polyamides, polyimides, polysulfones or polyethersulfones, cellulose acetate, regenerated cellulose or the like are suitable. Membranes of such materials can readily be energy-bonded at the edges in the manner according to the invention. Known methods, which effect bonding either by exposure to heat or by ultrasonic or high-frequency generation, are suitable for this purpose.

The invention will be explained below in more detail with reference to the attached FIGS. 1 to 4.

Figure 1:
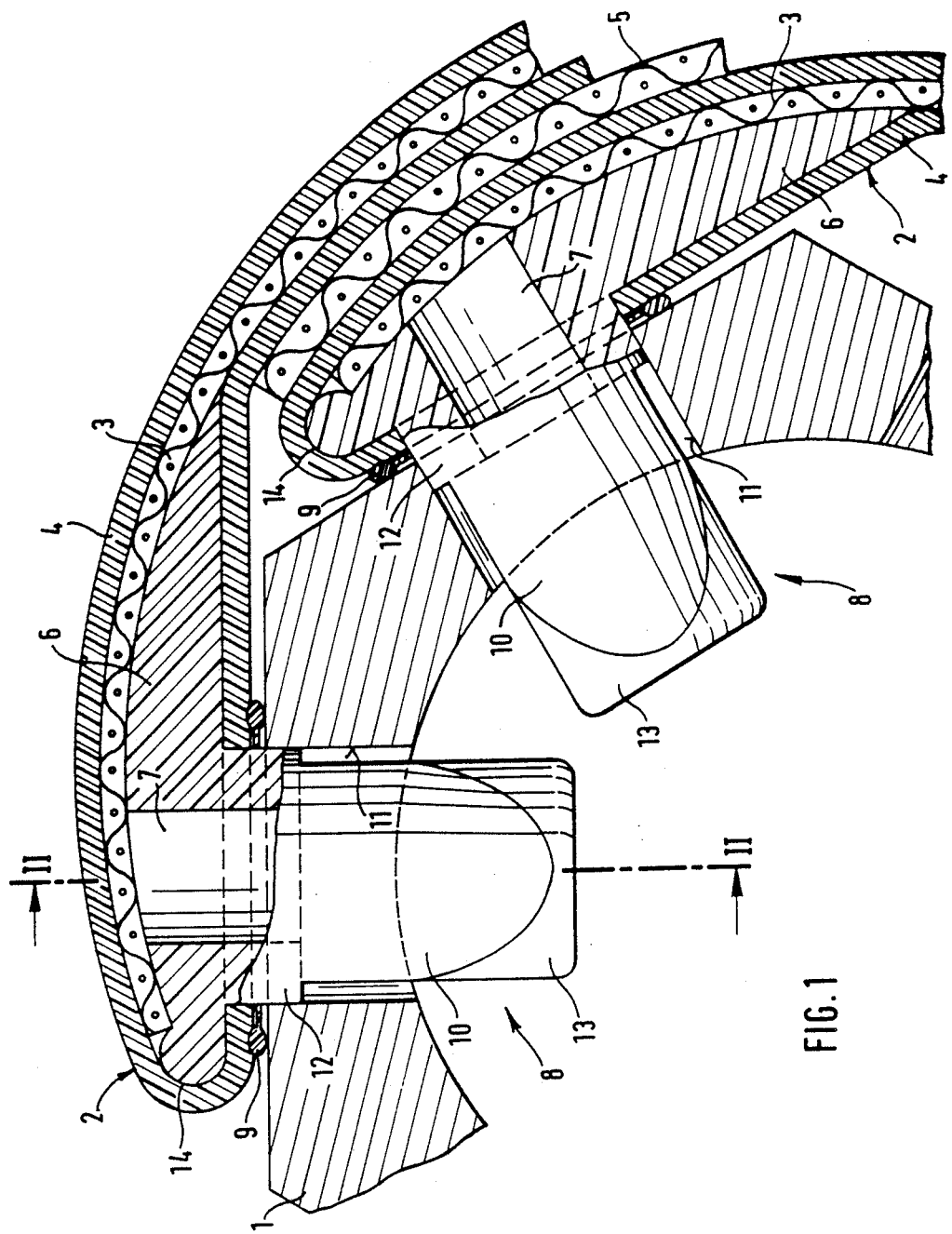
FIG. 1 shows a vertical section through a segment of the collection line, two membrane pockets being fixed according to the invention to the segment.

In detail, FIG. 1 shows that the collection line 1 in the embodiment shown has an inner circular cross-section and an outer hexagonal shape. Two membrane pockets 2 comprising a drainage layer 3 and semipermeable membranes 4 arranged on either side thereof are fitted on the illustrated segment of the collection line 1. A spacer 5 is shown between the membrane pockets 2. In the region of the permeate passage 7, the membrane pockets 2 are each provided with an insertion strip 6, the insertion strip being arranged within the membrane pockets 2 and being in direct contact with the drainage layer 3, and the membrane 4 being deflected around the end face 14 of the insertion strip 6. The insertion strip 6 has a pipe branch 12 inserted into the receiving bore 11 of the collection line 1 and serves to improve form stabilization. For effective prevention of separation material passing into the permeate space, the membrane pocket 2 is joined in the region of the permeate passage 7 via the insertion strip 6 to the collection line 1 by means of a clip fastener 8. For even further sealing of the critical point of the permeate passage, it is shown in the figure that an optional sealing ring 9 can be introduced between the membrane pocket 2 and the collection line 1. The clip fastener 8 retains the membrane pocket 2 via the support strip 6 in the collection line 1 by means of spring-elastic elements 13 molded to the pipe branch 12 and provided with snap-in projections 10.

Figure 2:
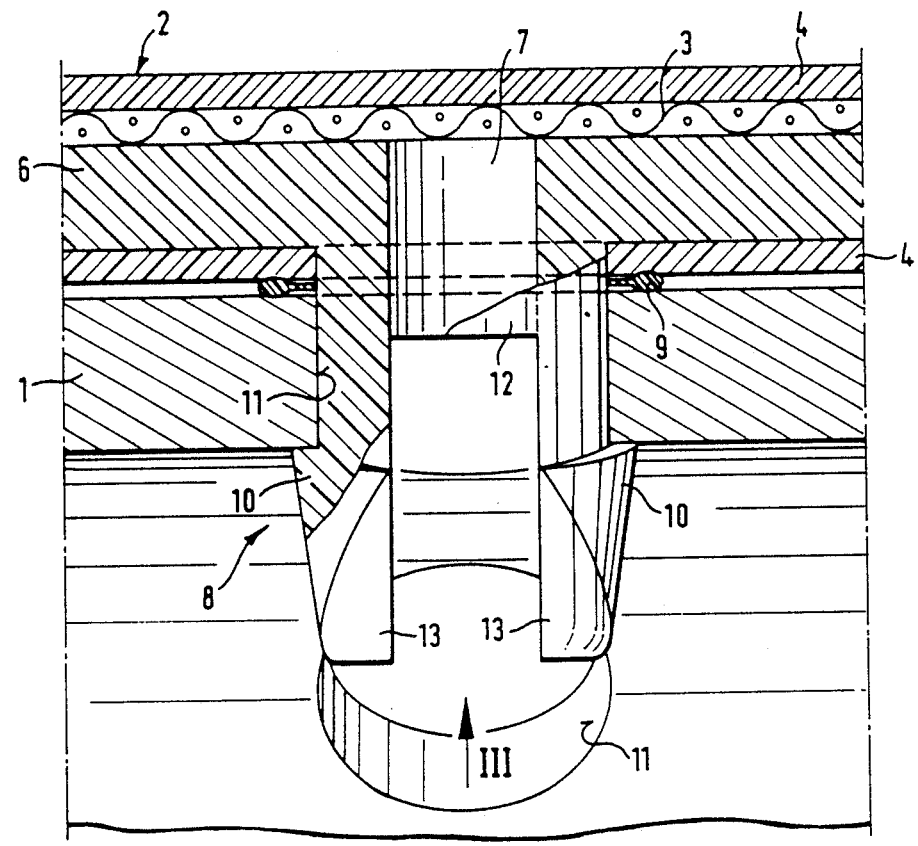
FIG. 2 shows a section, running parallel to the longitudinal axis of the collection line, through the collection line at a point where the permeate passes over, the section being taken along the line II—II in FIG. 1.

FIG. 2 shows the section along the line II—II in FIG. 1. In this view, the wall of the collection line 1 does not appear circular but as a sheet-like structure, thus, the curvature of the collection line 1 has to be imagined as protruding from the plane of the paper. In FIG. 2, the identical elements carry the same reference numerals. It can be seen here that the clip fastener 8 is fastened to or snapped in on the inner wall of the collection line 1 by means of snap-in projections 10 which are arranged on opposite sides of the clip fastener 8. The clip fastener 8 is composed of an elastic material, for example of plastic, and its external cross-section tapers towards its lower end. This ensures that, on insertion into the receiving bore 11 of the collection line 1, the clip fastener 8 elastically deforms its external diameter and, as soon as the snap-in projection 10 pushes over the inner wall of the collection line 1 or leaves the receiving bore 11 in the direction of the interior of the collection line 1, springs back again into its original shape, so that the clip fastener 8 is fixed in its position by the snap-in projection 10. The sealing ring 9 effects an additional safeguard which prevents a possible contamination of the permeate by separation material.

Figure 3:
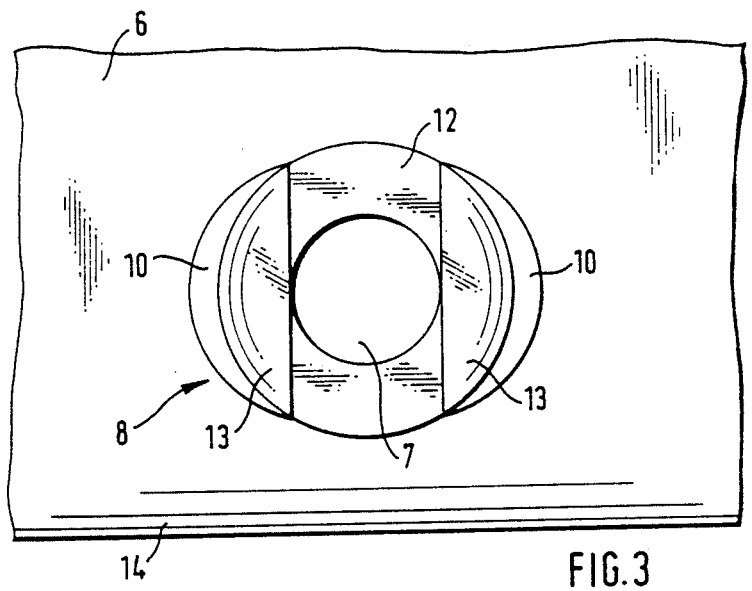
FIG. 3 shows a plan view of a clip arrangement of an insertion strip, along the arrow III in FIG. 2.

FIG. 3 shows a clip fastener 8 in a view rotated by 90°, wherein the longitudinal axis of the clip fastener 8 is perpendicular to the plane of the paper (cf. the viewing direction arrow III in FIG. 2). This shows the permeate passage 7 arranged centrally, and to the side the spring-elastic elements 13 with snap-in projections 10 arranged thereon and fitted to the pipe branch 12 of the insertion strip 6.

Figure 4:
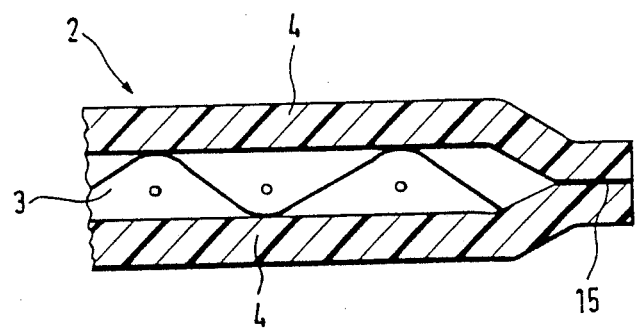
FIG. 4 shows a vertical section through an edge portion of a membrane pocket.

FIG. 4 shows an edge portion of a membrane pocket 2 formed by mutually joining the edges of two semipermeable membranes 4 with an energy-bonded seam 15. Reference numeral 3 indicates the drainage layer.

What is claimed is:

1. An apparatus for carrying out a membrane separation process, which comprises:
    (a) a centrally arranged collection line having at least one aperture therein;
    (b) at least one spirally wound-up membrane pocket arranged around said collection line, said membrane pocket containing at least one drainage layer and semipermeable membranes applied to both sides thereof, wherein said semipermeable membrane are mutually joined by energy-bonded seams at their edges to form said pocket;
    (c) a spacer between individual windings of said membrane pocket, defining a space for receiving material to be separated;
    (d) means defining a permeate passage from said drainage layer through said aperture into said collection line; and
    (e) means for spring elastically sealing the permeate passage for the space for receiving the material to be separated sufficient for providing effective sealing of spacing changes resultant from temperatures of up to above 100° C.

2. The apparatus as recited in claim 1, having at least two said membrane pockets spirally wound up about said collection line.

3. The apparatus as recited in claim 1, wherein said drainage layer comprises a fluid-permeable sheet-like structure.

4. The apparatus as recited in claim 1, wherein said spacer comprises a material the same as or similar to that of said drainage layer in the interior of said membrane pockets, and wherein said spacers are arranged between the windings of the individual membrane pockets.

5. The apparatus as recited in claim 1, wherein said membrane comprises a semipermeable symmetrical, asymmetrical or integral-asymmetrical membrane of plastic.

6. The apparatus as recited in claim 1, wherein said energy-bonded seams at the edges of said membrane pockets are bonded by means of exposure to heat or by ultrasonic or high-frequency energy.

7. The apparatus as recited in claim 1, wherein said membrane pockets each contain an insertion strip in the region of the permeate passage.

8. The apparatus as recited in claim 1, wherein said spring elastic sealing means comprises a clip fastener.

9. The apparatus as recited in claim 8, wherein said clip fastener comprises laterally extending snap-in projections for retention thereof on the inner wall of said collection line.

10. The apparatus as recited in claim 1, further comprising a sealing ring between said membrane pocket and said collection line.

* * * * *